(12) United States Patent
Begley et al.

(10) Patent No.: US 12,543,947 B2
(45) Date of Patent: Feb. 10, 2026

(54) METHOD FOR ASSESSING THE EFFICACY OF TREATMENTS FOR DRY EYE

(71) Applicant: THE TRUSTEES OF INDIANA UNIVERSITY, Bloomington, IN (US)

(72) Inventors: Carolyn G. Begley, Bloomington, IN (US); Ping Situ, Bloomington, IN (US); Trefford L. Simpson, Waterloo (CA)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 1106 days.

(21) Appl. No.: 17/609,800

(22) PCT Filed: Jun. 1, 2020

(86) PCT No.: PCT/US2020/035582
§ 371 (c)(1),
(2) Date: Nov. 9, 2021

(87) PCT Pub. No.: WO2020/243715
PCT Pub. Date: Dec. 3, 2020

(65) Prior Publication Data
US 2022/0218195 A1   Jul. 14, 2022

Related U.S. Application Data

(60) Provisional application No. 62/855,589, filed on May 31, 2019.

(51) Int. Cl.
*A61B 3/06* (2006.01)
*A61B 3/10* (2006.01)

(52) U.S. Cl.
CPC . *A61B 3/06* (2013.01); *A61B 3/10* (2013.01)

(58) Field of Classification Search
CPC .... A61B 3/06; A61B 3/10; A61B 3/00; A61B 3/0025; A61B 3/02; A61B 3/09; A61B 3/101; A61B 3/1015; A61B 3/103; A61B 3/107; A61B 3/125; A61B 3/14; A61B 3/165; A61B 5/483; A61B 5/4824; A61B 5/4827; A61B 5/4833
USPC .......................... 351/200, 205, 206, 222, 246
See application file for complete search history.

(56) References Cited

U.S. PATENT DOCUMENTS

| | | | |
|---|---|---|---|
| 2008/0086048 A1 | 4/2008 | Dupps, Jr. et al. | |
| 2014/0313488 A1 | 10/2014 | Kiderman et al. | |
| 2014/0316485 A1* | 10/2014 | Ackermann | A61N 1/36132 607/53 |
| 2017/0245750 A9* | 8/2017 | Korb | G06T 7/0012 |

(Continued)

FOREIGN PATENT DOCUMENTS

WO   2017/116826 A1   7/2017

OTHER PUBLICATIONS

PCT International Search Report and Written Opinion completed by the ISA/US on Aug. 17, 2020 and issued in connection with PCT/US2020/035582.

(Continued)

*Primary Examiner* — Travis S Fissel
(74) *Attorney, Agent, or Firm* — Barnes & Thornburg LLP

(57) ABSTRACT

Aspect of this invention include methods for measuring the connection between neurosensory abnormalities and dry eye and for testing the efficacy of new and existing therapies of the treatment of Dry Eye in patients with symptoms of this or related conditions.

20 Claims, 8 Drawing Sheets

(56) References Cited

U.S. PATENT DOCUMENTS

2017/0326163 A1* 11/2017 Driscoll ............ A61K 31/4748
2018/0339151 A1 11/2018 De Toni et al.
2019/0099071 A1 4/2019 Ehrmann

OTHER PUBLICATIONS

Extended European Search Report for counterpart EP patent application No. 20814051.7 dated Sep. 13, 2023.
Chen et al., "A Role of Corneal Mechanical Adaptation in Contact Lens-Related Dry Eye Symptoms", Investigative Opthalmology & Visual Science, vol. 52, No. 3, (Mar. 2, 2011), pp. 1200-1205, XP055395086, US, ISSN: 1552-5783, DOI: 10.1167/iovs.10-5349.
Illes et al., "Abnormal activity of corneal cold thermoreceptors underlies the unpleasant sensations in dry eye disease", Pain, vol. 157, No. 2, (Dec. 15, 2015), pp. 399-417, XP055604364, NL, ISSN: 0304-3959, DOI: 10.1097/j.pain.0000000000000455.

* cited by examiner

METHOD FOR ASSESSING THE EFFICACY OF TREATMENTS FOR DRY EYE

CROSS REFERENCE TO RELATED APPLICATIONS

This application is a U.S. national counterpart application of international application serial No. PCT/US2020/035582 filed Jun. 1, 2020, which claims priority to and the benefit of U.S. Provisional Patent Application No. 62/855,589, titled "METHODS FOR ASSESSING THE EFFICACY OF TREATMENTS FOR DRY EYE," filed 31 May 2019, the disclosures of which are hereby expressly incorporated by reference in their entireties.

STATEMENT OF GOVERNMENTAL SUPPORT

This invention was made with government support under EY021794 awarded by National Institutes of Health. The Government has certain rights in the invention.

FIELD OF THE INVENTION

This invention relates generally to materials and methods for measuring the connection between neurosensory abnormalities and Dry Eye and for using these methods to test the effectiveness of new and existing treatment for Dry Eye and related conditions.

BACKGROUND

Neurosensory abnormalities are considered to play an etiological role in dry eye disease, according to the 2017 international Dry Eye Workshop. Given the discomfort and complications often time associated with Dry Eye, there exists a need for additional methods of accurately diagnosing this condition and for assessing the efficacy of treatments of new and existing treatments for this condition.

SUMMARY

Some aspects of this disclosure include a battery of tests to assess the neurosensory function in a subset of Dry Eye patients (contact lens associated Dry Eye).

Some aspects include techniques for quantifying and monitoring neurosensory abnormalities in Dry Eye and may provide a link connecting symptoms and clinical signs of the condition.

Some aspects include methods for determining the efficacy of treatments for Dry Eye and related conditions these methods may include the step of estimating the threshold at which a given patient registers an ocular provocation, followed by determining a range of stimulus intensity based on the individual patent's threshold. In some aspects, the range is formulated as a ratio or fraction of the threshold value (i.e. take a ratio to or fraction of the threshold). Once the range has been determined, the patient is subjected to repeated stimulation ranging from sub- to supra-threshold. This regime provokes the (pain-related) neural mechanisms in systematic ways; individual patient responses to these provocations are measured using, methods such as magnitude estimation or scaling. In some aspects of the test is combined with additional provocative tests.

Provocative stresses to the ocular surface may be affected by methods such as repeatedly having patients keep their eyes open for as long as possible or applying hyperosmolar drops or adverse environmental conditions (windy and/or low humidity) to the eye. The patient's responses to these provocations may be measured after the provocation, using, for example an esthesiometer. The results obtained with individual patients are compared to the results of these experimental manipulations to known normative data and make the diagnosis of neurosensory abnormality in patients with dry eye.

At least from of the methods disclosed can be used to monitor the effectiveness of new therapeutic drugs or devices developed for the treatment of Dry Eye and related diseases and conditions.

At least from of the methods disclosed can be used to evaluate the effectiveness of new therapeutic drugs or devices designed to improve neurosensory function in dry eye.

At least from of the methods disclosed here can be used by eye care professionals in patient management and monitoring the progress of new and existing treatments for Dry Eye.

DESCRIPTION

Figure 1:
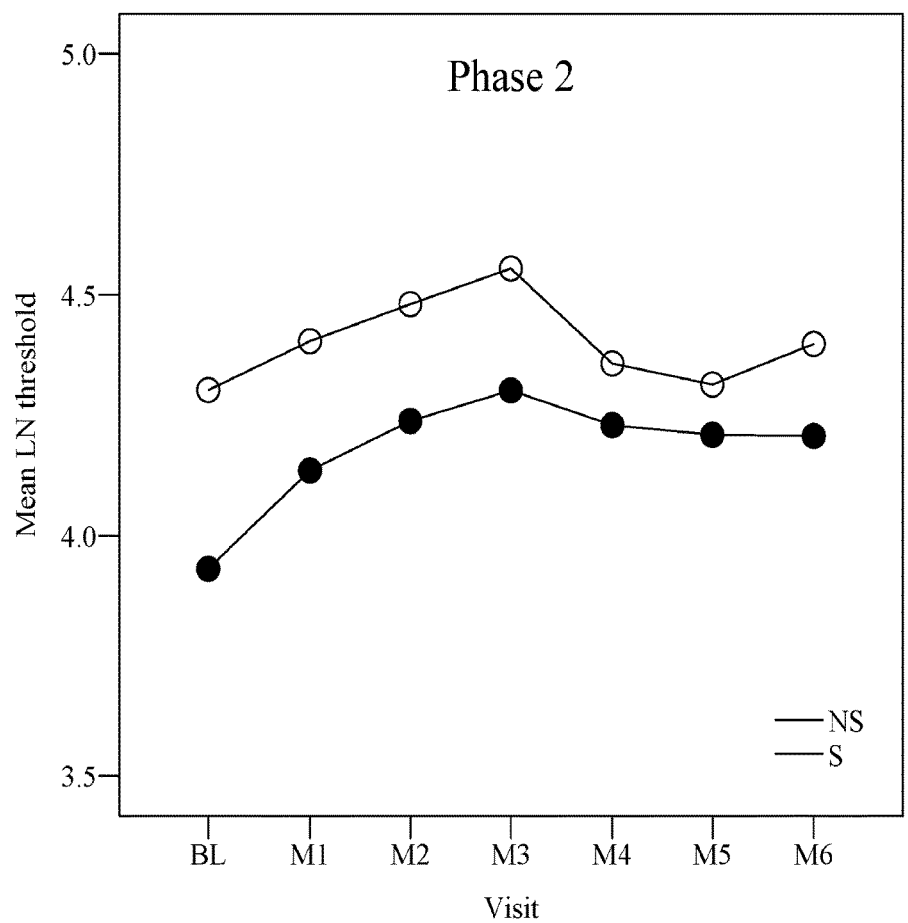
FIG. 1 Graph of Phase 2 data, mean LN Threshold versus Visit; the upper line is NS (Newly Developed Symptomatic), the lower line is S (Existing Symptomatic).
Figure 2A:
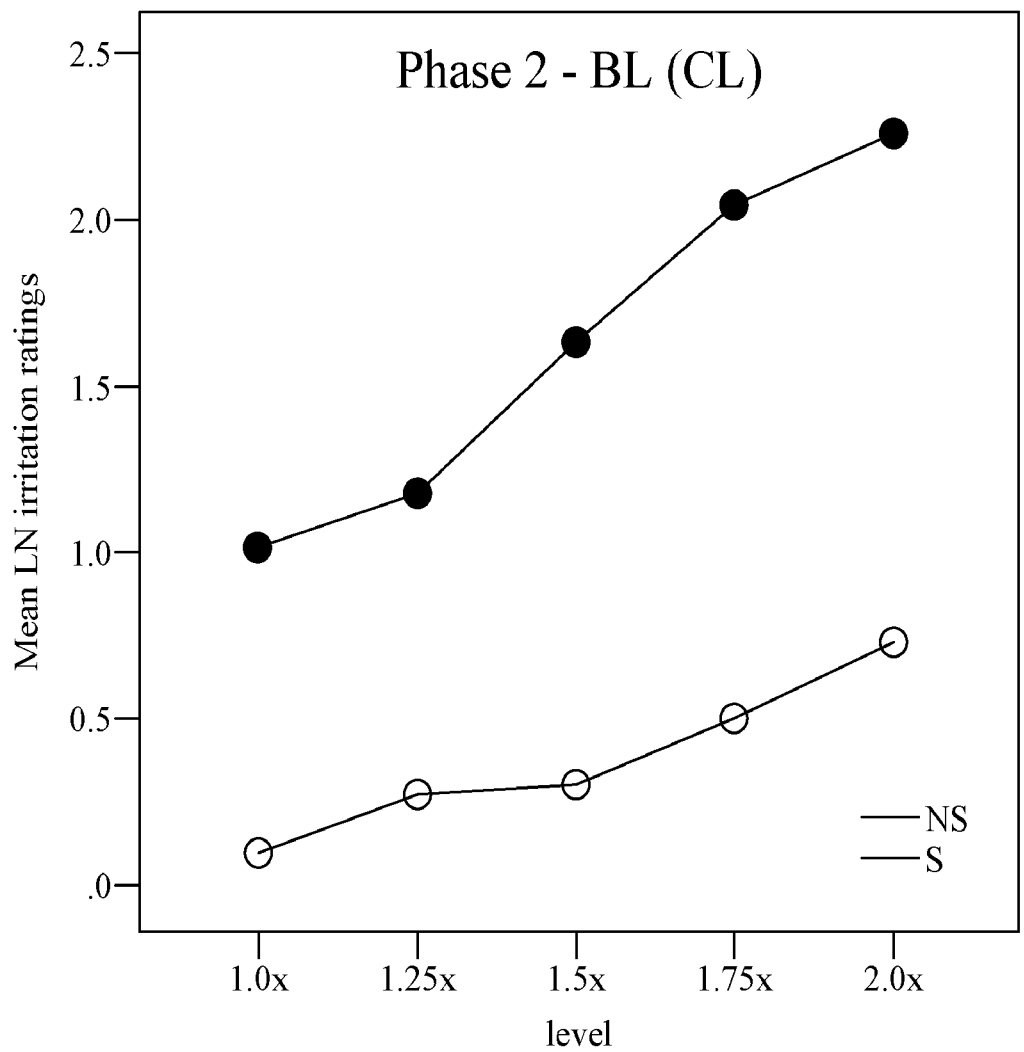
FIG. 2A. Graph of Phase 2-BL (CL (Contact Lens)) mean LN irritation ratings versus level; upper line is S; the lower line is NS.
Figure 2B:
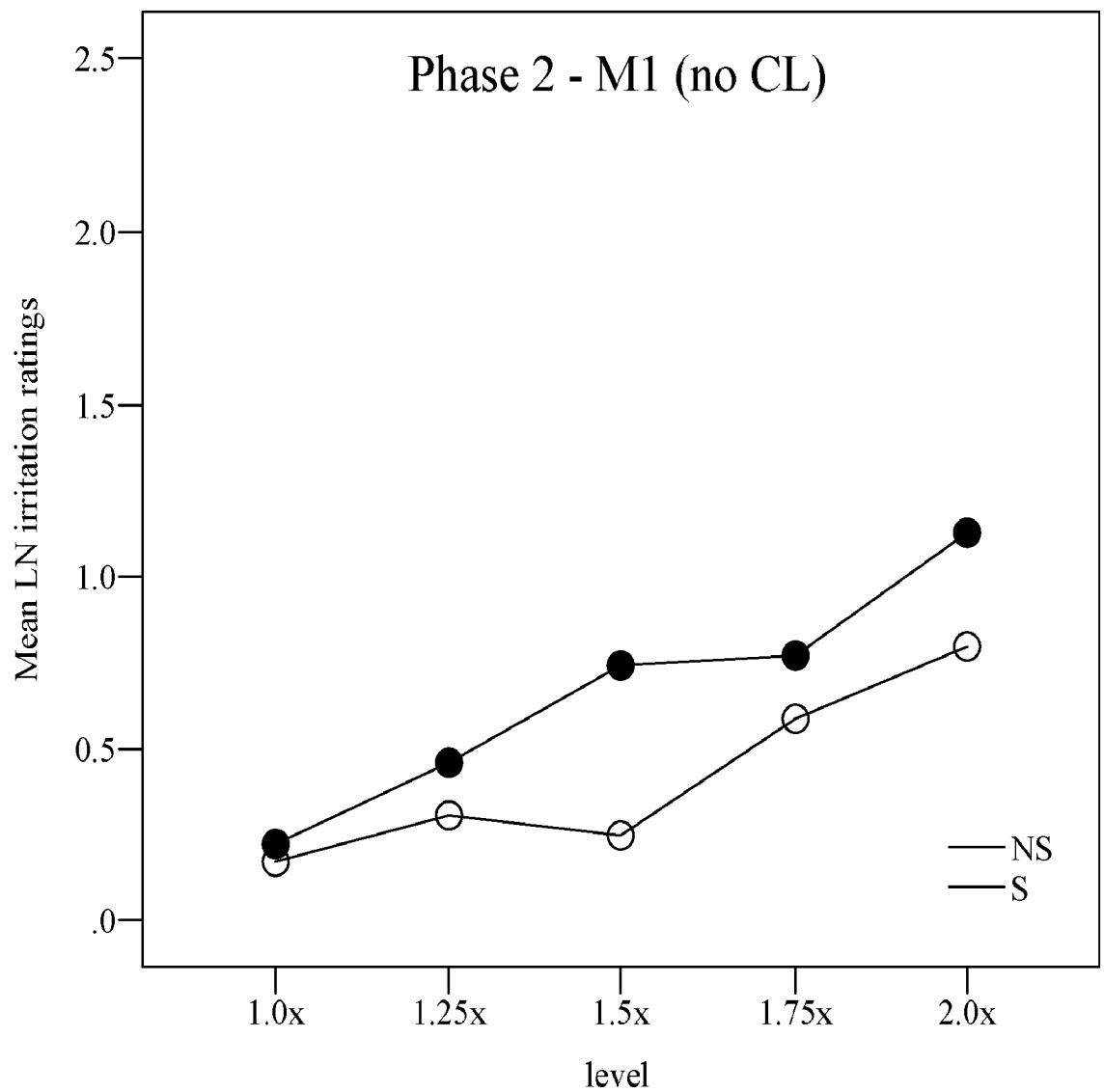
FIG. 2B. Graph of Phase 2-M1 (no CL) mean LN irritation ratings versus level; the upper line is S; the lower line is NS.
Figure 2C:
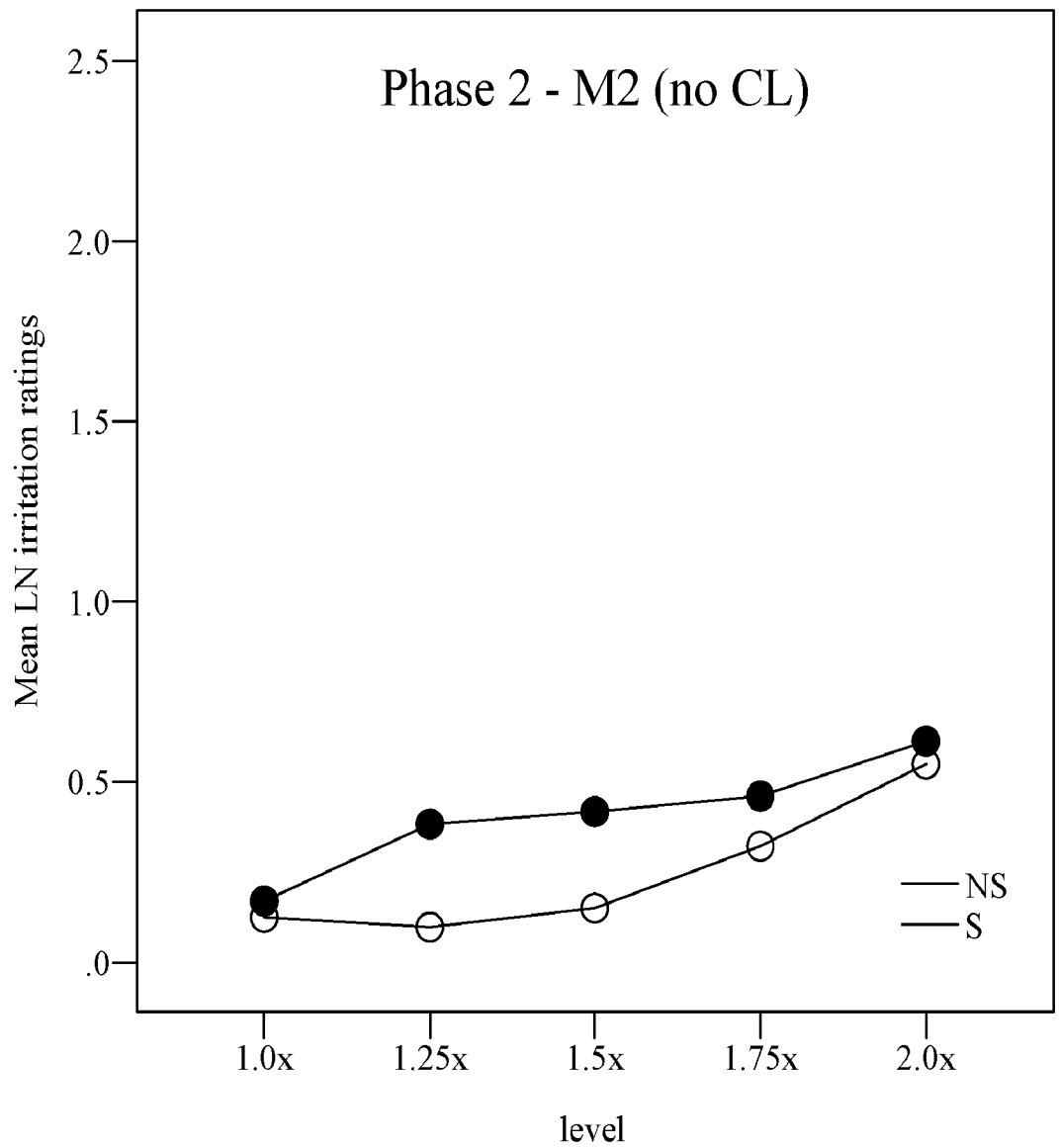
FIG. 2C. Graph of Phase 2-M2 (no CL) mean LN irritation ratings versus level; the upper line is S; the lower line is NS.
Figure 2D:
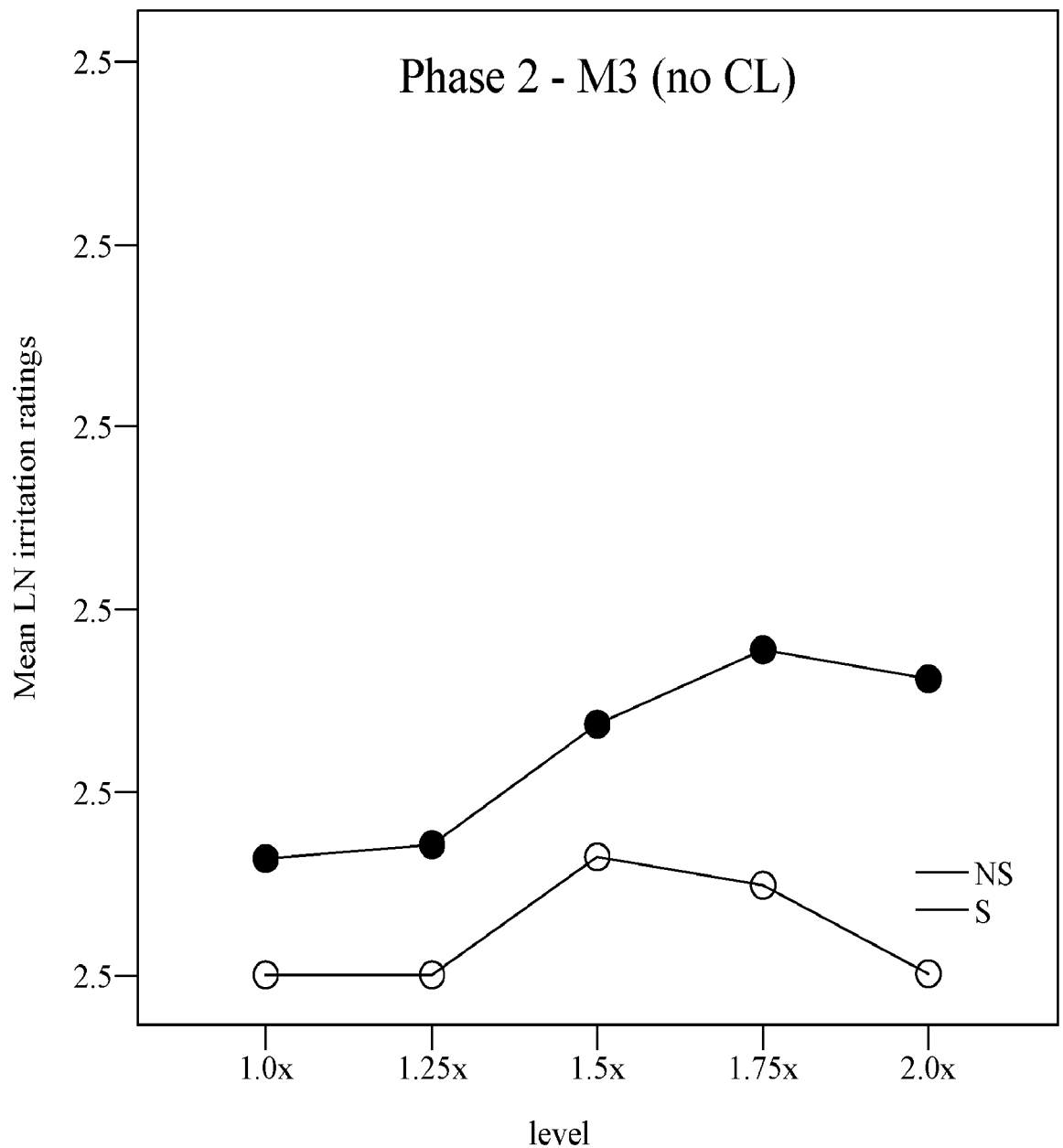
FIG. 2D. Graph of Phase 2-M3 (no CL) mean LN irritation ratings versus level; the upper line is S; the lower line is NS.
Figure 3A:
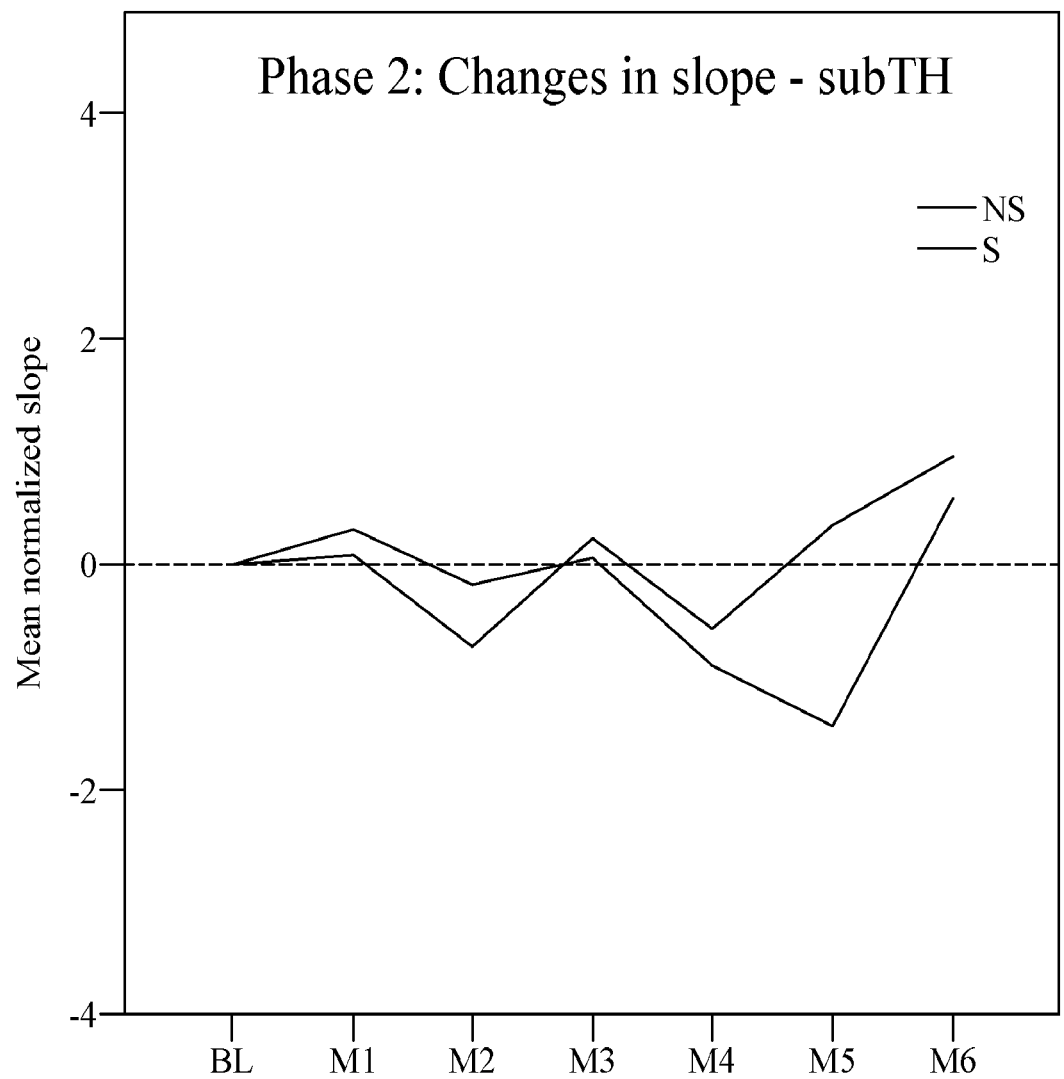
FIG. 3A. Graph of Phase 2: changes in slope—sub TH, mean normalized slope versus BL, M1-M6; the upper line is S, the lower line is NS.
Figure 3B:
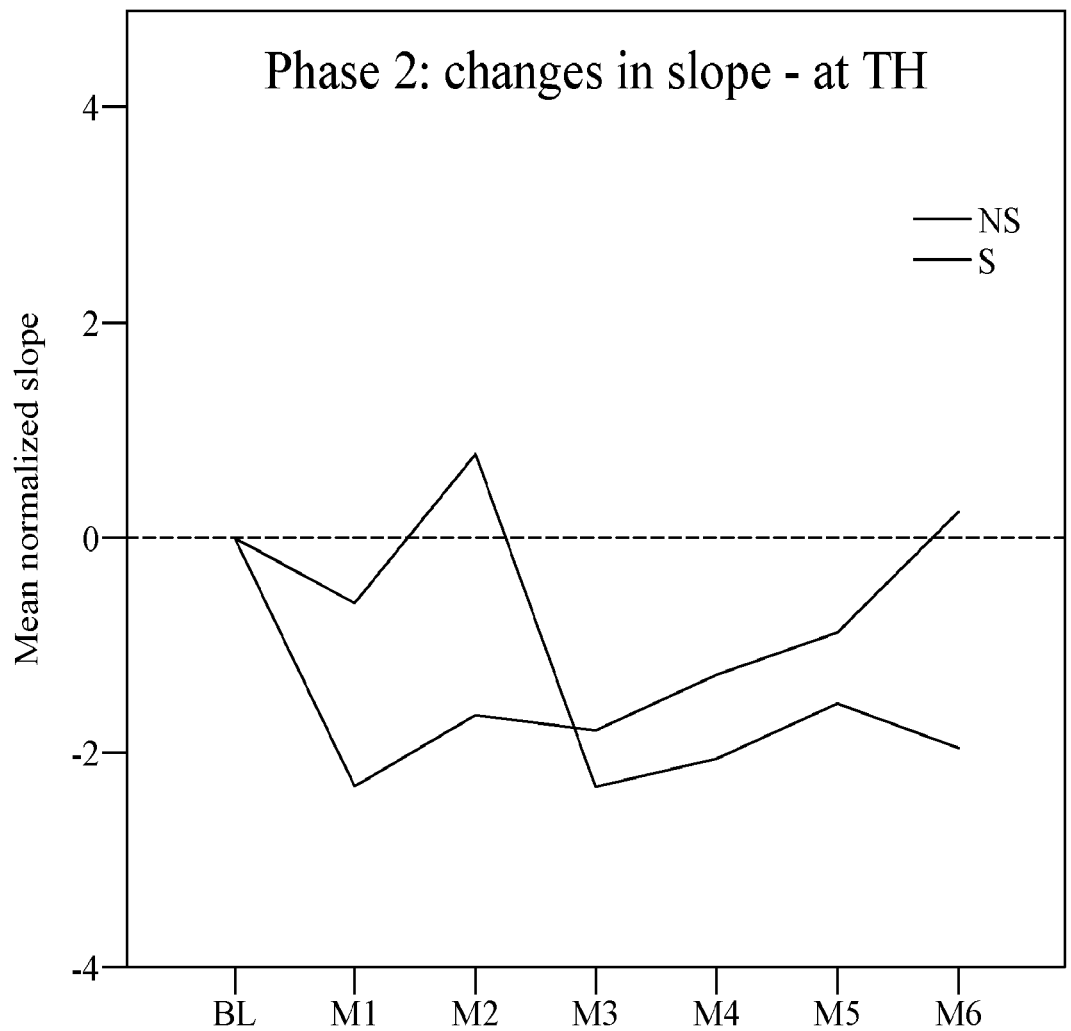
FIG. 3B. Graph of Phase 2: changes in slope at TH, mean normalized slope versus BL, M1-M6; the upper line at M2 is NS, the lower line at M2 is S.
Figure 3C:
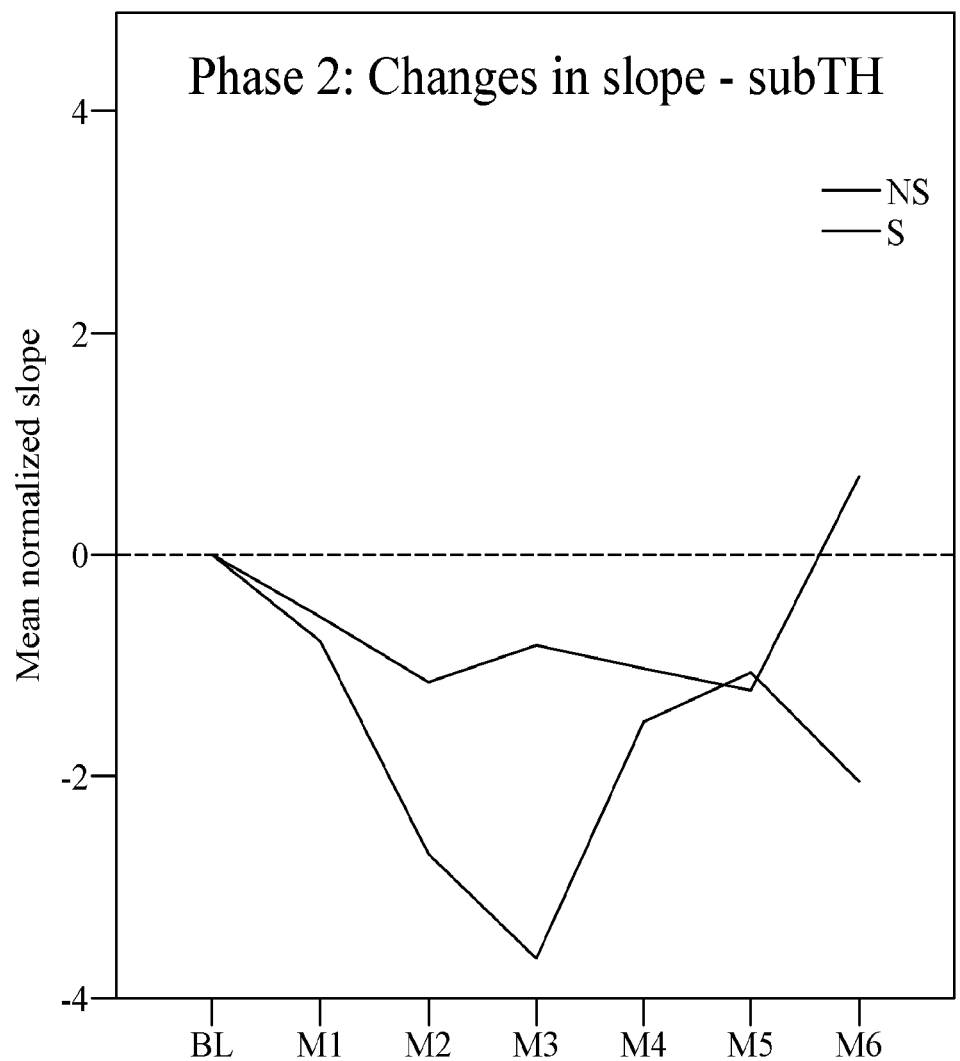
FIG. 3C. Graph of Phase 2: changes in slope at—sup TH, mean normalized slope versus BL, M1-M6; the upper line at M2 is S, the lower line at M2 is NS.

For the purposes of promoting an understanding of the principles of the novel technology, reference will now be made to the preferred embodiments thereof, and specific language will be used to describe the same. It will nevertheless be understood that no limitation is intended, and this discussion is by way of explanation and not by way of limitation.

Neural sensitization and adaptation play important roles in the etiology of the symptoms of dry eye and related disorders of the eye. Disclosed herein are techniques for assessing sensory responses to repetitive (for test adaptation) and suprathreshold stimuli (for test sensitization). The corneal neurosensory testing methods disclose herein may have practical utility as a monitoring test that could be used for dry eye therapeutic drug development and by optometrists and ophthalmologists to evaluate the effectiveness of therapy for dry eye disease. These methods can also be a useful tool for pharmaceutical companies working to develop effective dry eye therapeutics. These methods can also be used to monitor changes including improvements in neurosensory function and for use by eye care professionals working to improve patient management of dry eye and related conditions.

Ocular surface changes in dry eye have neurological effects. These include neural adaptation and sensitization. Some aspects of the disclosure methods for measuring how the ocular surface responds to sensory provocations that reflect these adaptation and sensitization effects. In some respects, the method employs repeated suprathreshold stimulation to probe sensitivity to ocular provocations in systematic ways. The resulting response to those provocations are measured and evaluated using, for example, magnitude estimation). In one embodiment the ocular surface sensory system is provoked by repeatedly having patients keep their eyes open for as long as possible, and this too, stimulates the nerves responsible for irritation and pain. The responses afterwards can be measured using an esthesiometer. Comparing the results of these experimental manipulations to known (normative) data and used to formulate the diagnosis of altered neural functioning in patients with dry eye and to initiate corrective action or treatment.

EXPERIMENTAL

Materials and Methods

We have the instrument and normative data. We also have data on sensory responses in symptomatic contact lens wearers, a subset of Dry Eye patients (contact lens associated Dry Eye) vs. asymptomatic contact lens wearers (non-dry eye contact lens wearers).

Methods: Subjects: 16 neophytes who developed contact lens related discomfort (NS) and 25 existing symptomatic or intolerant lens wearers (S) were enrolled. Participants in the study were deemed to be symptomatic lens wearers based on reported comfortable lens wear time<8 hrs accompanying a noticeable reduction in comfort over the course of the day and had Contact Lens Dry Eye Questionnaire-8 (CLDEQ-8) score for habitual symptoms≥14 (reporting frequency-≥sometimes and intensity≥2 for "eye discomfort" and "eye dryness").

Procedures:

Thresholds to pneumatic cool stimulus were measured using a computerized Belmonte pneumatic esthesiometer. A training session was performed for each participant prior to the first baseline measurement. The ascending method of limits (AML) was used to determine the thresholds, which was the average of three first reports of stimulus detection for each modality of stimulation.

Following a threshold measurement, sensory responses to repetitive and suprathreshold stimuli were quantified using the procedures outlined below to assess sensitization and adaptation.

Responses to suprathreshold stimuli: Pneumatic stimuli were set at five levels with equal separation, ranging from threshold to approximately two times (2×) the thresholds. In the case of relatively low thresholds, the stimulus range was justified to ensure that the intensity between steps was discriminable. Sensory magnitude was scaled using magnitude estimation (ME). Following each stimulus, subjects were asked to assign a number to the magnitude to the stimulus that directly reflected their subjective impression of the sensation they had perceived regarding intensity, coolness, irritation/discomfort and painfulness of the stimuli on a scale from 0 (none) to 100 (very strong).

Responses to repetitive stimuli: Threshold, subthreshold and suprathreshold (25% below and above threshold, respectively) were chosen. In each stimulus intensity session, 20 equal-intensity, 2-second trials were presented, with approximately 10-second interstimulus interval (ISI) for mechanical stimuli experiment. Subjects rated the intensity using a 5-point scale after each stimulus: 0, none; 1, very mild; 2, mild; 3, moderately strong; and 4, strong. Half points were accepted when appropriate.

The changes in sensory magnitude ratings and the slope of linear fit to the 20 repetitive trials were used as outcome variables. Repeated measures ANOVA with Huynh-Feldt p values were reported.

To assess sensitization: Based on each subject's threshold, pneumatic stimuli are set at 5 levels, equally separated, ranging from threshold to approximately 2 times of the threshold. They were presented in random order with an inter-stimulus interval. Following each stimulus, subjects are asked to assign a number that directly reflects their subjective impression with respect to intensity, coolness (or warmness), irritation and pain of the stimulus. To assess adaptation: One of the three levels of stimulus intensity (Threshold, 25% below and above threshold) is presented in a random order. Each session consists of 20 equal-intensity, 2-second trials with approximately 10-second interstimulus intervals. Following each stimulus, subjects rate the intensity.

Referring now to FIG. 1. The existing symptomatic group (S) showed greater sensory responses to cool stimuli, with higher corneal sensitivity, greater intensity ratings to sub-threshold repetitive stimuli and to suprathreshold stimuli at baseline.

During the 3 months not wearing contact lens washout, both S and NS (newly developed symptomatic) groups demonstrated decrease in sensitivity, magnitude of intensity and irritation to suprathreshold stimuli and ratings to repetitive stimuli, showing some extent of recovery in corneal neurosensory function.

After resuming contact lens wear, sensitivity tended to increase again but did not reach the baseline level at the end of the study. Similar trends were found in the ratings of response to repetitive stimuli, particularly to the sub-threshold stimuli and at the 6 months visit while the suprathreshold responses seemed to be less affected during the 3 months of resuming contact lens wear.

The following numbered clauses include embodiments that are contemplated and non-limiting:

Clause 1: A method for measuring ocular sensitivity, comprising the steps of: subjecting a patient to at least one ocular provocation to determine a threshold value at which a given patient registers an ocular provocation; measuring the patient's response to the ocular provocation; and formulating a range of stimulus intensity based on the patent's threshold value.

Clause 2: The method of clause 1, any other suitable clause, or any combination of suitable clauses, further comprising the steps of: subjecting the patient to a series of repeated ocular stimulations ranging from the sub-threshold to the supra-threshold of the patient's threshold value; and determining if the patient's response to the stimulations are higher or lower than a set of normative data.

Clause 3: The method of clause 2, any other suitable clause, or any combination of suitable clauses, wherein the range is formulated as a ratio or fraction of the threshold value.

Clause 4: The method of clause 3, any other suitable clause, or any combination of suitable clauses, wherein the ocular provocation is at least one provocation selected from the group consisting of: repeatedly having patients keep their eyes open for as long as possible, applying hyperosmolar drops, exposing the ocular surface to a windy condition, and exposing the ocular surface to a low humidity condition.

Clause 5: The method of clause 4, any other suitable clause, or any combination of suitable clauses, wherein the patient's response to the ocular provocation is measured using an esthesiometer.

Clause 6: The method of clause 2, any other suitable clause, or any combination of suitable clauses, further comprising the step of asking the patient to rate the intensity of each stimulation in the series of ocular stimulations on a five-point scale, one being equivalent to no intensity and five being equivalent to strong intensity.

Clause 7: The method of clause 2, any other suitable clause, or any combination of suitable clauses, further comprising the step of asking the patient to assign a number to the magnitude of each stimulation in the series of ocular stimulations that reflected the patient's impression of the sensation perceived on a scale of one to one-hundred, one being equivalent to no magnitude and one-hundred being equivalent to strong magnitude.

Clause 8: The method of clause 7, any other suitable clause, or any combination of suitable clauses, wherein the sensation perceived is one of the intensity, temperature, irritation, and painfulness.

Clause 9: The method of clause 2, any other suitable clause, or any combination of suitable clauses, wherein each stimulation in the series of ocular stimulations is a pneumatic stimulus with a duration of about two seconds.

Clause 10: The method of clause 1, any other suitable clause, or any combination of suitable clauses, wherein the range is formulated as a ratio or fraction of the threshold value.

Clause 11: The method of clause 1, any other suitable clause, or any combination of suitable clauses, wherein the ocular provocation is at least one provocation selected from the group consisting of: repeatedly having patients keep their eyes open for as long as possible, applying hyperosmolar drops, exposing the ocular surface to a windy condition, and exposing the ocular surface to a low humidity condition.

Clause 12: The method of clause 1, any other suitable clause, or any combination of suitable clauses, wherein the patient's response to the ocular provocation is measured using an esthesiometer.

Clause 13: A method of testing a treatment, comprising the steps of: measuring a patient's response to an ocular provocation before the treatment by (i) subjecting the patient to a series of repeated ocular stimulations ranging from the sub-threshold to the supra-threshold of a patient's threshold value and (ii) determining if the patient's response to the ocular stimulations are higher or lower than a set of normative data, administering the treatment to the patient, and remeasuring the patient's response to the ocular provocations after the treatment by (i) subjecting the patient to the series of repeated ocular stimulations ranging from the sub-threshold to the supra-threshold of the patient's threshold value and (ii) and determining if the patient's response to the ocular stimulations are higher or lower than the set of normative data.

Clause 14: The method of clause 13, any other suitable clause, or any combination of suitable clauses, wherein the method further comprising the steps of: comparing the patient's response to the ocular stimulations measured before the treatment to the patient's response to the ocular stimulations measured after the treatment and determining the effectiveness of the treatment based on the comparison.

Clause 15: The method of clause 14, any other suitable clause, or any combination of suitable clauses, wherein the ocular provocation is at least one provocation selected from the group consisting of: repeatedly having patients keep their eyes open for as long as possible, applying hyperosmolar drops, exposing the ocular surface to a windy condition, and exposing the ocular surface to a low-humidity condition.

Clause 16: The method of clause 15, any other suitable clause, or any combination of suitable clauses, wherein the patient's response to the ocular provocation is measured using an esthesiometer.

Clause 17: The method of clause 13, any other suitable clause, or any combination of suitable clauses, wherein the patient's response to the ocular provocation is measured using an esthesiometer.

Clause 18: The method of clause 13, any other suitable clause, or any combination of suitable clauses, wherein the treatment is a medicament.

Clause 19: The method of clause 13, any other suitable clause, or any combination of 8 suitable clauses, wherein the treatment is a change in patient behavior.

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A method for measuring ocular sensitivity, comprising the steps of:
   subjecting a patient to at least one ocular provocation to determine a threshold value at which a given patient registers an ocular provocation;
   measuring the patient's response to the ocular provocation; formulating a range of stimulus intensity based on the patient's threshold value;
   subjecting the patient to a series of repeated ocular stimulations ranging from the sub-threshold to the supra-threshold of the patient's threshold value; and
   determining if the patient's response to the ocular stimulations are higher or lower than a set of normative data,
   wherein the ocular provocation comprises repeatedly having patients keep their eyes open for as long as possible and applying hyperosmolar drops.

2. The method of claim 1, wherein the range is formulated as a ratio or fraction of the threshold value.

3. The method of claim 2, wherein the ocular provocation is selected from the group further comprising
   exposing the ocular surface to a windy condition, and
   exposing the ocular surface to a low humidity condition.

4. The method of claim 3, wherein the patient's response to the ocular provocation is measured using an esthesiometer.

5. The method of claim 1, further comprising the step of: asking the patient to rate the intensity of each stimulation in the series of ocular stimulations on a five-point scale, zero being equivalent to no intensity and four being equivalent to strong intensity.

6. The method of claim 1, further comprising the step of asking the patient to assign a number to the magnitude of each stimulation in the series of ocular stimulations that reflected the patient's impression of the sensation perceived on a scale of one to one-hundred, one being equivalent to no magnitude and one-hundred being equivalent to strong magnitude.

7. The method of claim 6, wherein the sensation perceived is one of the intensity, temperature, irritation, and painfulness.

8. The method of claim 1, wherein each stimulation in the series of ocular stimulations is a pneumatic stimulus with a duration of about two seconds.

9. The method of claim 1, wherein the ocular provocation is selected from the group further comprising
exposing the ocular surface to a windy condition, and
exposing the ocular surface to a low humidity condition.

10. The method of claim 1, wherein the patient's response to the ocular provocation is measured using an esthesiometer.

11. A method of testing a treatment, comprising the steps of:
measuring a patient's response to an ocular provocation before the treatment by (i) subjecting the patient to a series of repeated ocular stimulations ranging from the sub-threshold to the supra-threshold of a patient's threshold value and (ii) determining if the patient's response to the ocular stimulations are higher or lower than a set of normative data,
administering the treatment to the patient, and
remeasuring the patient's response to the ocular provocations after the treatment by (i) subjecting the patient to the series of repeated ocular stimulations ranging from the sub-threshold to the supra-threshold of the patient's threshold value and (ii) and determining if the patient's response to the ocular stimulations are higher or lower than the set of normative data,
wherein the ocular provocation comprises repeatedly having patients keep their eyes open for as long as possible and applying hyperosmolar drops.

12. The method of claim 11, wherein the method further comprising the steps of: comparing the patient's response to the ocular stimulations measured before the treatment to the patient's response to the ocular stimulations measured after the treatment and determining the effectiveness of the treatment based on the comparison.

13. The method of claim 12, wherein the ocular provocation is selected from the group further comprising
exposing the ocular surface to a windy condition, and
exposing the ocular surface to a low humidity condition.

14. The method of claim 13, wherein the patient's response to the ocular provocation is measured using an esthesiometer.

15. The method of claim 11, wherein the patient's response to the ocular provocation is measured using an esthesiometer.

16. The method of claim 11, wherein the treatment is a medicament.

17. The method of claim 11, wherein the treatment is a change in patient behavior.

18. The method of claim 6, wherein the sensation perceived is one of the intensity, temperature, and irritation.

19. The method of claim 11, further comprising the step of asking the patient to assign a number to the magnitude of each stimulation in the series of ocular stimulations that reflected the patient's impression of the sensation perceived on a scale of one to one-hundred, one being equivalent to no magnitude and one-hundred being equivalent to strong magnitude.

20. The method of claim 19, wherein the sensation perceived is one of the intensity, temperature, and irritation.

* * * * *